Patented Nov. 30, 1926.

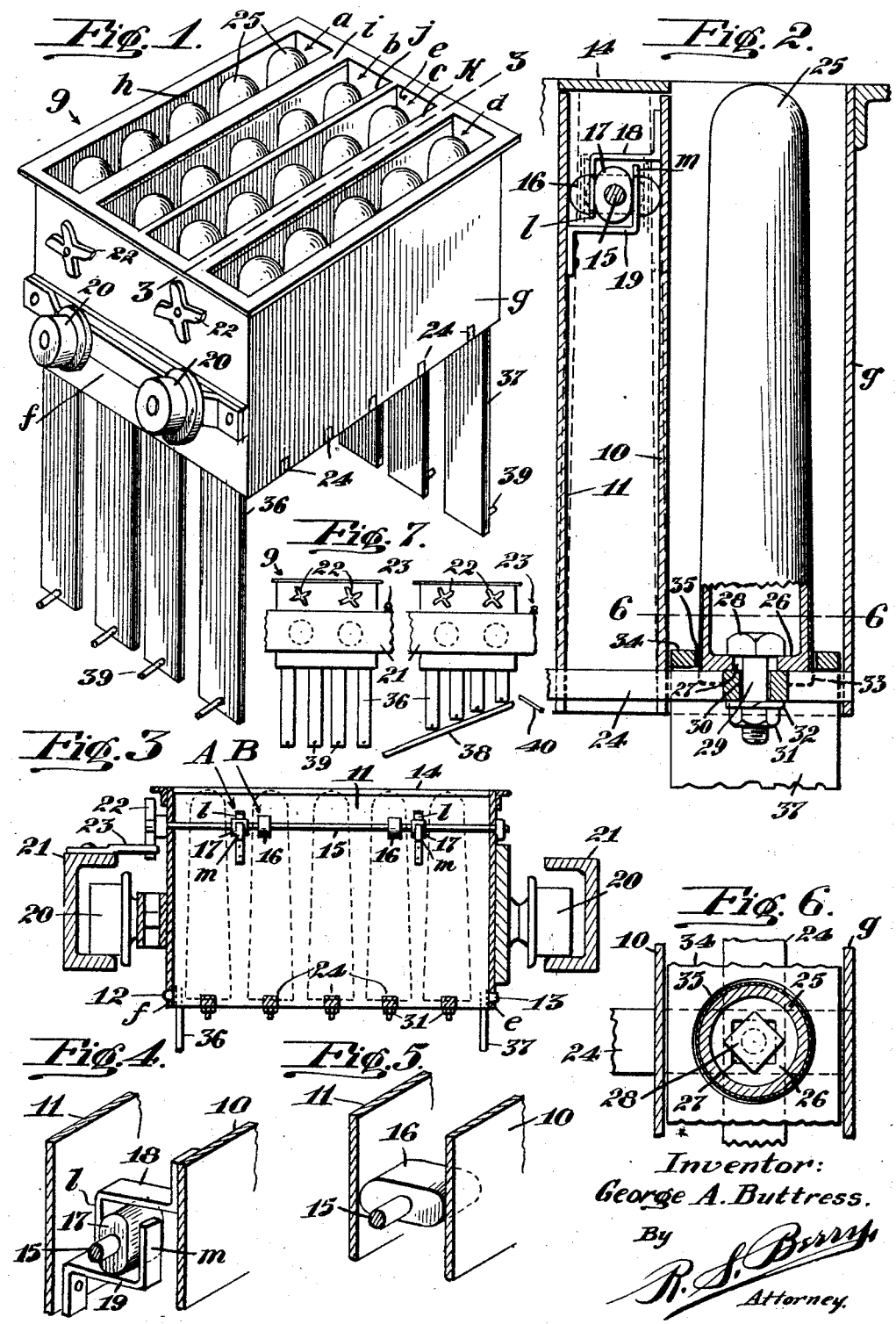

1,608,769

UNITED STATES PATENT OFFICE.

GEORGE A. BUTTRESS, OF LOS ANGELES, CALIFORNIA, ASSIGNOR TO BUTTRESS GYPSUM TILE COMPANY, OF LOS ANGELES, CALIFORNIA, A CORPORATION OF CALIFORNIA.

MOLD BOX.

Application filed May 27, 1925. Serial No. 33,223.

This invention particularly pertains to mold boxes of the type employed in the manufacture of hollow building blocks from a plastic composition, and especially relates to improvements in mold boxes of the type used in the block-forming machine set forth in my co-pending application filed February 26, 1924, Serial Number 695,138.

An object of the invention is to provide a mold box so constructed as to facilitate the removal of the molded blocks therefrom.

Another object is to provide a mold box with a wall adapted to be moved away from the surface of the block molded thereagainst in such manner as to break contact and adhesion between the wall and the block and afford a clearance to permit ready ejection of the block from the mold, and including mechanically operable means for effecting movement of the wall actuable on advancing the mold box on a supporting track and adapted to normally dispose the movable wall in a fixed position during the molding operation.

A further object is to provide a mold box having a core for forming spaces within the molded block with means whereby the core may be securely held fixed in the mold box, yet be readily assembled therein and removed therefrom, and which core is so formed as to be highly resistant to fracture and to present a smooth glossy surface to the molded material which cannot become fouled with rust and from which the molded plastic will readily separate.

With the foregoing objects in view together with such other objects and advantages as may subsequently appear, the invention resides in the parts and the construction, combination and arrangement of parts hereinafter fully described and claimed and illustrated by way of example in the accompanying drawings, in which:—

Fig. 1 is a perspective view of the mold box;

Fig. 2 is a detail in section and elevation as seen on the line 2—2 of Figs. 1 and 3;

Fig. 3 is a detail in longitudinal vertical section as seen on the line 3—3 of Fig. 1;

Fig. 4 is a detail in perspective as seen in the direction indicated by the arrow A in Fig. 3 illustrating the means for retracting the movable side walls of the mold box;

Fig. 5 is a detail in perspective as seen in the direction indicated by the arrow B in Fig. 3, showing the device for advancing the side walls of the mold box;

Fig. 6 is a detail in horizontal section as seen on the line 6—6 of Fig. 2;

Fig. 7 is a diagrammatic view in side elevation illustrating the operation of the invention.

More specifically, 9 indicates generally a mold box here shown as embodying a plurality of mold chambers $a$, $b$, $c$ and $d$ but which may include any suitable number of mold chambers. The mold box proper comprises end walls $e$ and $f$ and side walls $g$ and $h$, and also includes partitions $i$, $j$ and $k$, whereby its interior is divided into the several mold chambers $a$, $b$, $c$ and $d$; the partitions being carried by the end walls $e$ and $f$.

An important feature of the present invention resides in providing each of the mold chambers with at least one side wall adapted to be moved transversely in the direction of its thickness so that it may be advanced and retracted relative to the mold chamber. In the embodiment of the invention here shown, the partition between a pair of adjacent mold chambers, such as the partitions $i$ and $k$, is formed by means of a pair of spaced side wall plates 10 and 11, as particularly shown in Fig. 2, and which plates are affixed at their lower ends as to the end walls $e$ and $f$ by means of lugs 12 and 13 as shown in Fig. 3, whereby the upper portions of the plates may be shifted laterally. The space between the plates 10 and 11 is covered at the upper ends of the plates by means of a wall 14 carried by the ends of the mold box.

Means are provided for normally maintaining the movable plates 10 and 11 in an advanced position during the molding operation, and also for retracting the plates to afford a clearance in the mold chamber after a block has been molded therein to permit ready ejection of the block. This means is here shown as embodying a rotary shaft 15 arranged in the space between the plates 10 and 11 and extending lengthwise thereof with the end portions of the shaft journalled in the end plates of the mold box. The axis of the shaft 15 extends on a plane mid-way between the plates 10 and 11 and mounted on the shaft is one or more plate-advancing cams 16, particularly shown in Fig. 5, which embodies end portions projecting diametrically on opposite sides of the shaft 15 adapted to abut against the inner faces of the plates 10 and 11 when the cam is disposed in its horizontally extending position, as shown in Figs. 2 and 5, whereby the plates 10 and 11 will be disposed and maintained in their advanced positions and substantially parallel with the opposite sides of the mold chamber. It is to be noted that the cam 16 is elongated and has its opposite end faces disposed equidistant from the axis of the shaft 15. The ends of the cam 16 are preferably rounded as shown.

Mounted on the shaft 15 is one or more plate-retracting cams 17, each of which cams is elongated and has its end portions rounded and projecting equidistant on opposite sides of the shaft 15; the cam 17 being of shorter length than the cam 16. The cams 16 and 17 are arranged on the shaft 15 with their longitudinal centers extending at right angles to each other. Mounted on the plates 10 and 11 are brackets 18 and 19 which extend on opposite sides of the shaft 15, the brackets having end portions $l$ and $m$, respectively, arranged to be engaged by the working faces of the cam 17; the end portion $l$ of the bracket 18 projecting downwardly along the edge of the cam 17 opposite the plate 10 on which the bracket 18 is carried, and the projection $m$ on the bracket 19 projecting upwardly along the edge of the cam remote from the plate 11. The cam 17 is thus arranged between the vertically extending end portions $l$ and $m$ of the brackets 18 and 19 in such manner that when the cam 17 is disposed in its horizontal position as indicated in dotted lines in Fig. 2 at which time the cam 16 will be disposed in its vertical position in such manner as to push the brackets 18 and 19 in opposite directions, and thereby draw the plates 10 and 11 toward each other into their retracted position. It will now be seen that when the shaft 15 is rotated a quarter of a revolution from the position shown in full lines in Fig. 2, the spreading cam 16 will be moved out of operative relation to the plates 10 and 11 and the cam 17 will operate to retract the plates, and that by then turning the shaft another quarter of a revolution the cam 16 will restore the plates to their advanced position. In this manner the plates are alternately advanced and retracted on each quarter revolution of the shaft 15. When the plates 10 and 11 are in their advanced positions, the members $l$ and $m$ will abut against the cams 17 and thereby limit outward movement of the plates.

Rollers 20 are provided on the ends of the mold box which travel on rails 21 of a track affording a support for the mold box and on which the latter is movable. The mold box may be advanced on this track in any desired manner, and means are provided whereby this advanced movement of the mold box will effect intermittent rotation of the shaft 15 and thereby cause the alternate retraction and advance of the movable side walls 10 and 11 of the mold chamber. This means is here shown as embodying a star wheel 22 mounted on the shaft 16 at one end of the mold box and spaced fixed projecting fingers 23 arranged to successively engage the star wheel 22 as the mold box advances, these fingers being adapted to operate as the mold box moves forward to engage the star wheel and effect rotation thereof one-fourth of a revolution. The fingers 23 are spaced apart such distance as to afford a prolonged period of rest of the shaft 15 between the operation thereof, so that as the mold box moves forward the movable wall of the mold chamber will be alternately held in its advanced and retracted positions for suitable lengths of time.

Mounted on the underside of the mold box is a series of rods 24 suitably spaced apart which afford supports for a series of cores 25 arranged in the mold chamber and projecting upwardly from the supporting bar. The cores 25 are preferably circular in cross section, as shown in Fig. 6 and are slightly tapered from their lower to their upper ends, the upper end portions being rounded or dome shaped. Each of the cores is preferably formed hollow for the purpose of minimizing weight and has its lower end provided with inturned flanges 26 arranged to form an end opening 27 so shaped that the head 28 of a bolt 29 may be passed therethrough and to form a ledge on which the underside of the bolt head 28 may seat on turning the bolt to position the bolt head out of register with the opening 27 after the bolt head has been inserted in the latter as shown in Figs. 2 and 6. The bars 24 are formed with openings 30 to receive the bolts 29. After passing the bolts through the openings 30, nuts 31 are seated on the lower ends of the bolts against lock washers 32 so as to clamp the lower ends of the cores in their seated positions on the bars 24. As a means for facilitating centering of the cores on the bars the lower ends of the cores are recessed as indicated at 33 so as to set astride the bar with the walls of the recess conforming to the upper portion of the bar. The exposed superficial area of the core is covered with a surface coating such as vitrified enamel, whereby it is glazed and rendered smooth, non-absorptive and immune to rust. The core thus formed permits ready separation of the core from the contracting surface of the plastic materials molded thereagainst, as plaster will not readily adhere thereto, thus facilitating removal of the molded block from the mold chamber.

Arranged in each of the mold chambers is a vertically movable bottom plate 34 which is apertured at 35 to receive the cores 25, plate normally seats on the bars 24, and depending from the end portions of the plate 34 are downward extensions 36 and 37 which are adapted on advance movement of the mold box to be engaged by an inclined rail 38 and be thereby caused to move upwardly so as to elevate the bottom plate 34 in ejecting the molded block from the mold chamber.

The bottom plate 34 after being elevated may be restored to normal either by gravity or by effecting a downward pull on the extensions 36 and 37 after the latter leaves the rail 38, as by causing outwardly projecting pins 39 on the lower ends of the extensions 36 and 37 to ride against the underside of an inclined rail 40 as the mold box advances.

In order to effect the desired operation of the invention the inclined track 38 is disposed between a pair of fingers 23 so that one of the fingers will operate to effect rotation of the star wheel 22 and the shaft 15 and thus retract the movable side wall plates 10 and 11 at a time previous to elevation of the bottom plate 34 by the action of the inclined rails 38 on the extensions 36 and 37 and so that the other finger 23 will operate to turn the star wheel and shaft to advance the plates 10 and 11 to normal after the plate 34 has been elevated and preferably on the latter being restored to a lower position.

In the operation of the invention the parts are disposed as shown in Fig. 2 before filling the mold, that is with the movable side walls in their normal advanced positions and with the bottom walls in their normal lowermost positions, whereupon a suitable plastic composition is delivered to the mold chamber through the open upper end thereof in any desired manner. After the composition has been allowed to set the movable side walls are retracted as by the action of a finger 23 on the star wheel 22 on advancing the mold box on its track, which movement of the side walls of the mold chamber breaks the contact thereof with the surface of the molded block and affords a clearance which will permit ready ejection of the block on upward movement of the plate 24.

While I have shown the preferred form of my invention, as now known to me, it will be understood that various changes might be made in the combination, construction and arrangement of parts by those skilled in the art without departing from the spirit of the invention as claimed.

I claim:—

1. A mold box having side walls at least one of which is adapted to move inwardly and outwardly in the direction of the thickness of the wall, a turnable shaft extending to one side of said wall, means operable on turning said shaft to alternately advance and retract said movable wall, and means whereby advancing the mold box will effect turning of said shaft.

2. A mold box having side walls at least one of which is movable laterally, a shaft extending alongside said movable wall, means operable on turning said shaft a partial revolution to move said wall in one direction, means operable on turning the shaft another partial revolution to move said wall in the opposite direction, and means whereby advancing the mold box will act to effect intermittent turning of said shaft.

3. A mold box having side walls at least one of which is movable laterally, a shaft extending alongside said movable wall, a cam on said shaft operable on turning said shaft a partial revolution to move said wall in one direction, and a second cam on said shaft operable on turning the shaft another revolution to move said wall in the opposite direction.

4. A mold box having side walls at least one of which is movable laterally, a shaft extending alongside said movable wall, a cam on said shaft operable on turning said shaft a partial revolution to move said wall in one direction, a second cam on said shaft operable on turning the shaft another revolution to move said wall in the opposite direction, and means actuated by advancing the mold box to effect intermittent turning of said shaft, whereby said cam will be alternately positioned to dispose said movable wall alternately in its advanced and retracted positions.

5. The combination of a mold box, a support on which said mold box is adapted to travel, a movable side wall in said mold box, a star wheel carried by said mold box, means operable on advancing the mold box for effecting intermittent rotation of said star wheel, and means operable by rotating said star wheel for shifting said movable side wall in the direction of its thickness adapted to alternately dispose said wall in an advanced and a retracted position.

6. In a block molding device, a mold box having a molding chamber open at its top, a support on which said mold box is adapted to travel, a vertically movable bottom wall in said mold chamber, means operable to effect upward and downward movement of said bottom wall on advancing said mold box, a vertically extending plate constituting the side wall of said mold chamber, said plate being adapted to be moved laterally in the direction of its thickness, means for positioning said plate in its innermost position when said bottom wall is in its lowermost position, and means operable on advancing said mold box to retract said plate and to hold same in its retracted position while said bottom wall is moving upwardly.

7. In a molding device of the character described, a mold box having a mold chamber open at its top, a laterally movable plate constituting a side wall of said chamber, a vertically movable plate constituting the bottom wall of the chamber, a support on which said mold box is adapted to travel, means operable on advancing said mold box to intermittently advance and retract said side wall plate, and means operable on advancing said mold box to effect upwardly movement of said bottom wall when said movable side wall is in its retracted position.

8. In a molding device of the character described, a mold box having a mold chamber enclosed by side and end walls and open at its top and bottom, a bar carried by the mold box extending across the lower end portion of said chamber, a hollow core arranged in said chamber formed with an inturned flange at its lower end provided with a recess adapted to seat on said bar, and means engaging said flanging bar affording a rigid support for said core adapted to admit removal and replacement of the core.

GEORGE A. BUTTRESS.